United States Patent [19]

Mumma et al.

[11] 4,353,455

[45] Oct. 12, 1982

[54] ARTICLE HANDLING APPARATUS

[75] Inventors: Harold J. Mumma; Michael E. Reed, both of Riverside, Calif.

[73] Assignee: FMC Corporation, Chicago, Ill.

[21] Appl. No.: 825,617

[22] Filed: Aug. 18, 1977

[51] Int. Cl.$^3$ .............................................. B65G 47/24
[52] U.S. Cl. .................................. 198/384; 198/453; 198/598; 198/599; 198/636
[58] Field of Search ............... 198/384, 443, 453, 454, 198/456, 458, 598, 599, 633, 636, 637, 779; 209/106

[56] References Cited

U.S. PATENT DOCUMENTS

| | | | |
|---|---|---|---|
| 2,115,255 | 4/1938 | David et al. | 198/598 |
| 2,823,787 | 2/1958 | Morgan | 198/384 |
| 2,920,737 | 1/1960 | Engleson et al. | 198/458 |
| 2,974,794 | 3/1961 | Fry | 209/106 |
| 3,024,889 | 3/1962 | Reading | 198/779 |
| 3,300,021 | 1/1967 | Holmes | 198/779 |
| 3,367,477 | 2/1968 | Leth | 198/456 |
| 3,610,400 | 10/1971 | Burkholder | 198/384 |
| 3,794,161 | 2/1974 | Peterson | 198/779 |

Primary Examiner—Joseph E. Valenza

Attorney, Agent, or Firm—R. B. Megley

[57] ABSTRACT

A potato handling apparatus includes a roller conveyor for receiving a continuous stream of irregularly sized potatoes with an aligning section at the upstream end of the conveyor which includes a series of two parallel flaps for turning and pushing the potatoes lengthwise into the valleys of the roller conveyor. To eliminate all but one potato from each valley, a singulating section is provided. The singulating section includes a rod longitudinally disposed adjacent one edge of the roller conveyor and a series of parallel overlapping sprocket-like discs which extend diagonally across the conveyor to a downstream position which is inwardly spaced from said edge of the conveyor. Each disc has cogs formed on the periphery thereof which perforate the valleys in succession to a depth which prevents the potatoes from being pinched between the discs and rollers. The discs sequentially push all but one of the potatoes in a respective valley over said edge of the conveyor, while the rod prevents single potatoes not acted upon by the discs from wandering over the outside edge of the conveyor. A resilient rotatable member is pivotally mounted above the passageway by the downstream disc to retain longer potatoes on the conveyor.

6 Claims, 9 Drawing Figures

FIG_3

FIG_4

FIG_5

FIG_6

FIG_7

FIG_8

FIG_9

ARTICLE HANDLING APPARATUS

BACKGROUND OF THE INVENTION

1. Field of the Invention

The present invention generally relates to article handling apparatus, and more particularly concerns an apparatus for handling elongate articles, such as potatoes, including a combination of a roller conveyor and means for laterally transferring articles carried on the roller conveyor.

2. Description of the Prior Art

As is well known, potatoes grow in widely varying sizes. Inasmuch as different users, such as bakeries, restaurants and households, require potatoes of different sizes or weights, potato packing houses employ special article handling equipment for sorting potatoes according to size and weight. Generally, the equipment includes a rough sizing apparatus for removing very small and very large potatoes and a weight-sizing apparatus which receives the remaining potatoes from the rough sizing apparatus and sorts them into groups according to predetermined weight ranges.

A known conventional weight-sizing apparatus includes four transversely spaced, endless series of interconnected weighing cups. The cups are elongated to receive potatoes with the long axes of the potatoes extending in a direction transverse to the direction of travel of the cups. Each of the cups pivot downwardly to release the potato therein at one of several weighing stations dependent upon the weight of such potato.

Potatoes may vary in size to the extent that the largest potato of a particular group may be twice as long as the smallest potato of the group. To assure that potatoes of such great size range are fed only one at a time to a weighing cup and with the potato being parallel to a weighing cup, an article handling apparatus known in packing house parlance as a turn-and-time table is used. This apparatus includes four conveying lanes aligned with the series of cups of the weight sizer, with each lane including a belt conveyor and a segmented conveyor thereabove comprised of a plurality of transversely oriented, uniformly spaced parallel bars disposed above the belt conveyor. The belts and the overlying segmented conveyor are driven at different speeds such that the bars of the segmented conveyor cause the potatoes to align themselves transversely to their paths of travel. One operator for each conveying lane is employed to check the alignment of the potatoes and, most importantly, to remove all but one potato in the lane between the adjacent bars of the segmented conveyor. Assuming the operator effectively removes potatoes as necessary and realigns improperly aligned potatoes, potatoes will be discharged from the turn-and-time table one at a time to the weight cups.

As is also well known, labor costs have been increasing rapidly in recent years. It will therefore be recognized that a fully automatic apparatus for receiving a continuous stream of potatoes and arranging the potatoes into one or more generally uniformly spaced and oriented files would be desirable.

SUMMARY OF THE INVENTION

It is the primary object of the present invention to provide an apparatus for handling articles such as potatoes which accomplishes the foregoing objective.

More particularly, the apparatus of the present invention comprises a roller conveyor having an upper reach with articles such as potatoes being continuously deposited at the upstream end thereof and with the articles being discharged in a single file and in timed relationships from the downstream end thereof. The present invention contemplates a combination of a roller conveyor and an assembly mounted diagonally across the upper reach of the roller conveyor for laterally transferring all but one of the articles over an edge of the roller conveyor to thereby leave a single file of articles on the conveyor at the side of the conveyor adjacent such edge. The lateral transfer assembly comprises means for moving a plurality of cogs in a circumferential path and, preferably, includes a plurality of sprocket-like discs rotatably and vertically mounted to a support frame diagonally above the roller conveyor in parallel, overlapping relationships. The discs have cogs integrally formed on the periphery thereof. The cogs of each disc sequentially project into the succession of valleys between the rollers of the underlying portion of the roller conveyor. The discs are mounted to the support frame such that the downstream one of the pair of adjacent discs is disposed behind the downstream end of the adjacent upstream disc. Articles on the roller conveyor are prevented from being caught between the discs and the rollers by the perforating action of the cogs filling the valleys between the rollers of the conveyor.

To achieve singulation of the articles, the discs of the lateral transfer assembly extend diagonally from one edge of the roller conveyor, downstream and across the roller conveyor to a selected distance from the opposing edge of the conveyor to thereby form a passageway adjacent the downstream disc of the series. The width of the passageway is selected according to the range of dimensions of the articles being handled such that all but one article carried in a valley will be pushed by the lateral transfer assembly over the edge of the roller conveyor.

Another aspect of the apparatus of the present invention relates to the handling of elongate articles such as potatoes. For the purpose of assuring that the elongate articles are oriented lengthwise in the valleys between the rollers, the present invention provides at least one flexible flap member, but preferably two flap members, each of which extends diagonally between the sides of the upstream end of the roller conveyor. A vertical wall is positioned at one side of the flap or flaps, and a sloped wall is positioned adjacent to the other side of the flaps. The elongate articles impinge against the lower end of the flap member and are forced by the flap member to turn and fall lengthwise into the valleys between the rollers.

Articles which are not turned into the valleys are urged laterally by the flap or flaps toward the side margin of the roller conveyor which is adjacent the sloped sidewall, thereby facilitating removal of such improperly oriented articles downstream of the sloped sidewall.

When the articles being handled are both elongated and asymmetrically configured about their long axes (e.g., potatoes, avocadoes), they will tend to wander in the valleys between the rotating rollers of the conveyor. To prevent the elongate articles from wandering over the outside edge of the conveyor, a low barrier member, preferably in the form of a rod, extends longitudinally along such outside edge at a selected distance from the uppermost surfaces of the rollers.

According to another aspect of the present invention, when the articles being handled are elongate and also vary greatly in their lengths, a mechanism is provided at the passageway adjacent the downstream disc for yieldably applying a force on the articles carried in the valleys of the roller conveyor through the passageway so that an exceptionally long article will not be caused to gravitate over the edge of the conveyor. This can happen because the passageway must be limited in length to insure that two small articles do not pass therethrough. Such mechanism may comprise a resilient member rotatably mounted to one end of an arm with the other end of the arm being pivotally mounted to an overhead support frame to allow the member to articulate up and down over the passageway as the articles pass therebeneath.

DESCRIPTION OF THE PREFERRED EMBODIMENTS

Figure 1:
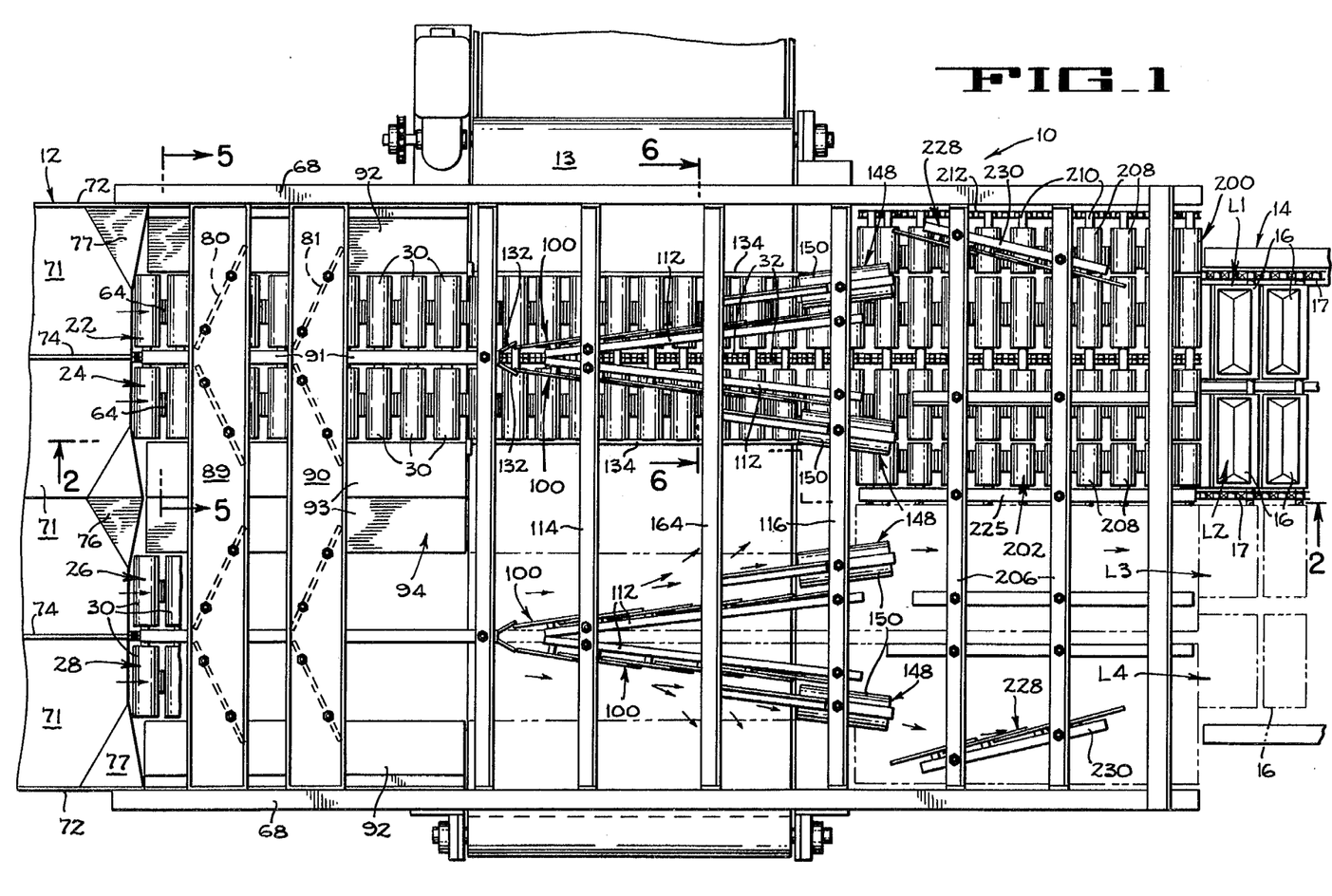
FIG. 1 is a top plan view of a preferred embodiment of the article handling apparatus of the present invention.
Figure 2:
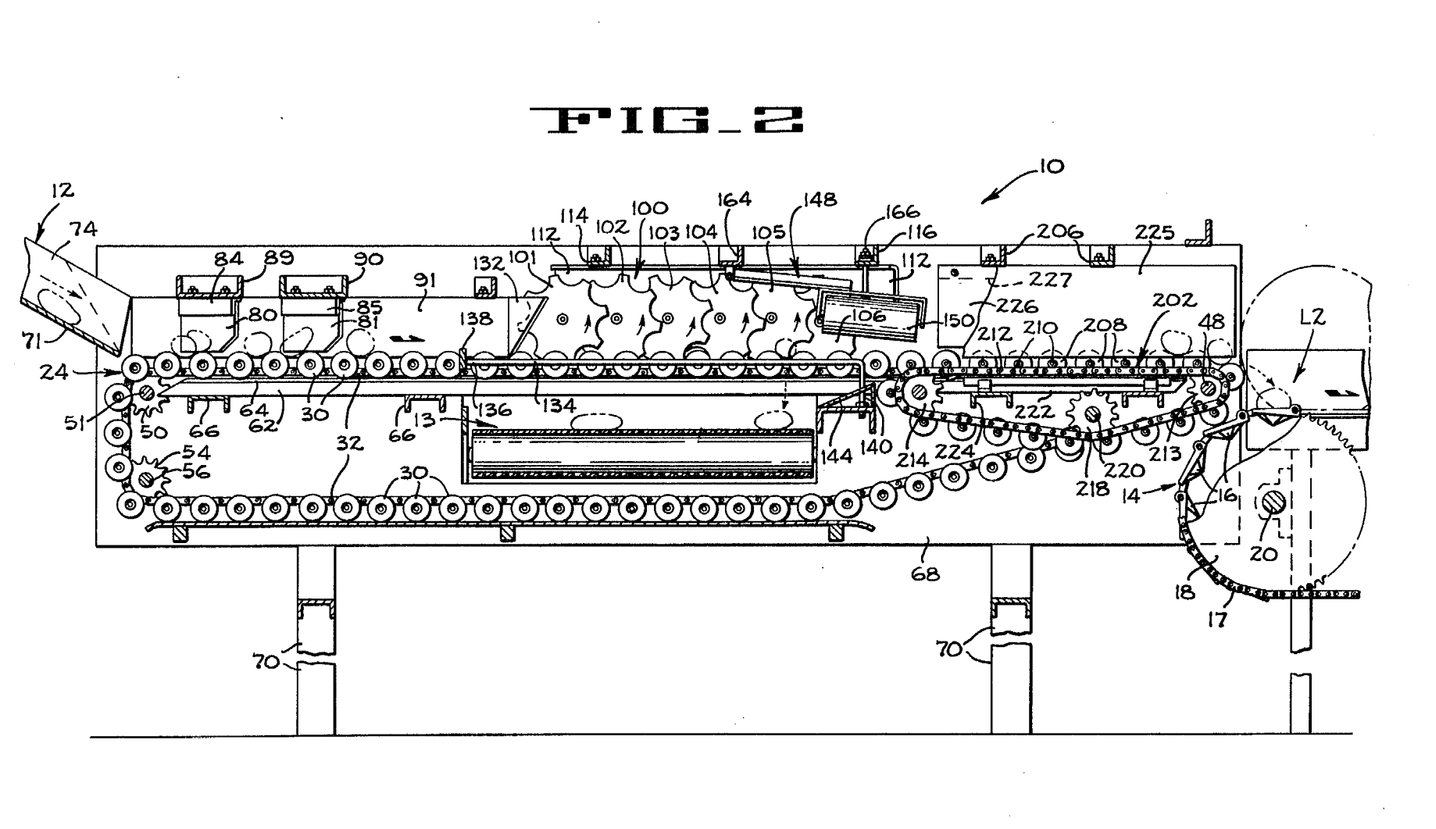
FIG. 2 is a sectional view taken on line 2—2 of FIG. 1.

Referring now more particularly to FIGS. 1 and 2, wherein the general arrangement of the invention is illustrated, it will be seen that the article singulating and aligning apparatus 10 of the present invention is arranged to receive a continuous stream of potatoes from a delivery chute 12 (shown in part) and discharge potatoes in four files and timed relationships to the four lanes L1, L2, L3, and L4 of weighing cups 16 of a weight sizing apparatus 14 (shown in part). The interconnected cups 16 in each of the lanes are uniformly spaced and are mounted upon endless chains 17 which are entrained about sprockets 18 (one only shown in FIG. 2) mounted on a drive shaft 20. The four-lane potato weight-sizing apparatus 14 is of a conventional construction.

Figure 3:
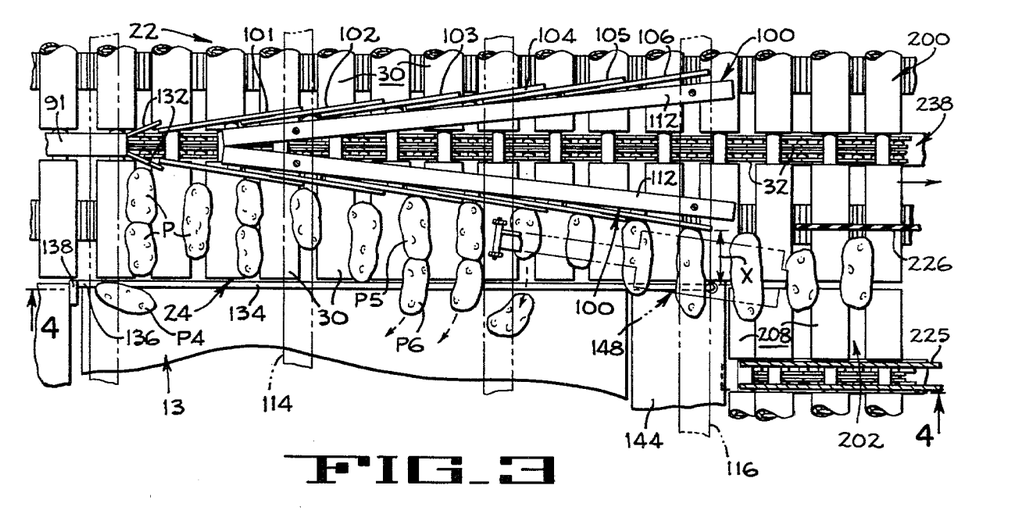
FIG. 3 is an enlarged fragmentary top plan view of the singulating section of the apparatus shown in FIG. 1.
Figure 4:
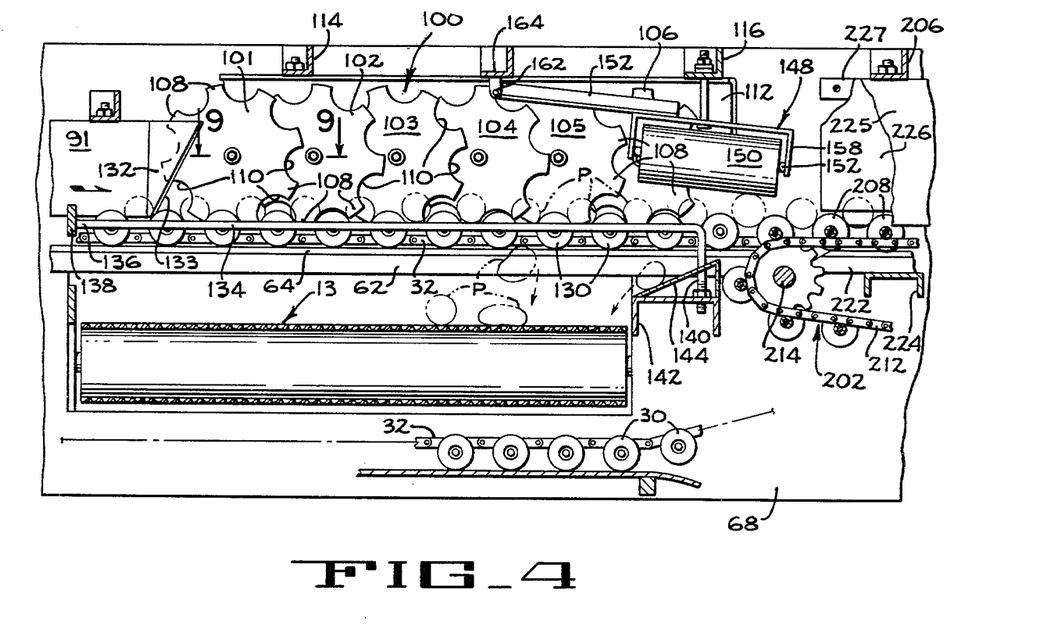
FIG. 4 is a sectional view taken on line 4—4 of FIG. 3.
Figure 5:
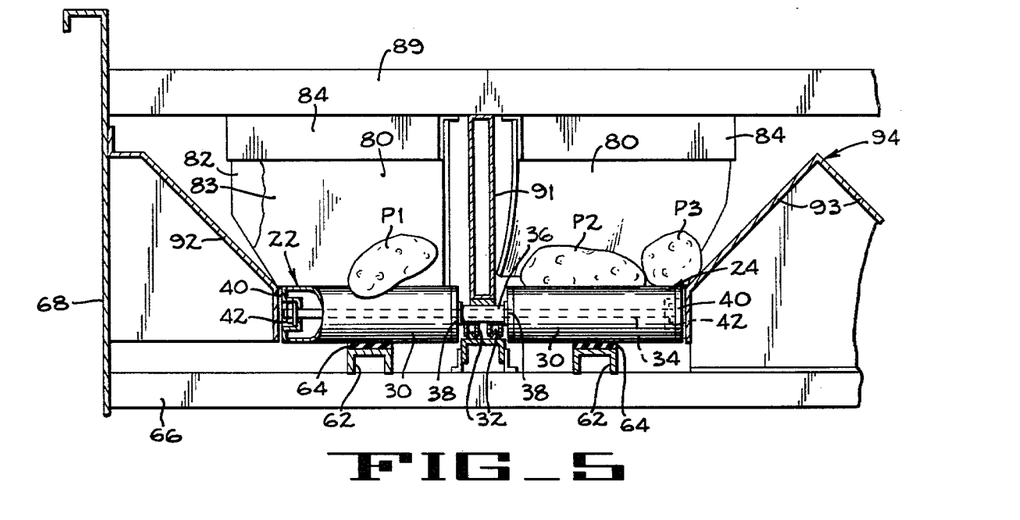
FIG. 5 is an enlarged sectional view taken on line 5—5 of FIG. 1.

As generally illustrated in FIGS. 1 and 2, and depicted with more detail in FIGS. 3-5, the apparatus 10 includes four parallel roller conveyors 22, 24, 26, and 28. The four roller conveyors are arranged in two pairs, with a first pair including conveyors 22 and 24 and a second pair including conveyors 26 and 28. Inasmuch as each of the pairs of roller conveyors are identically constructed, only the pair of conveyors 22 and 24 are illustrated in detail in the drawings, and the description herein will be limited to that of the construction of such pair of roller conveyors 22 and 24.

The roller conveyors 22 and 24 are each comprised of a series of uniformly spaced, cylindrical rollers 30. As shown in FIG. 5, the aligned rollers 30 of the adjacent conveyors 22 and 24 are rotatably mounted on a common shaft 34 which is connected to and driven by a centrally disposed endless chain assembly comprised of two endless chains 32 and a tubular collar 36. The collar is welded to the adjacent chain links of the two chains 32 so that it is received upon the chains, as shown in FIG. 5. The shaft 34 is received within the collar 36 with the inner ends 38 of the adjacent rollers 30 being journaled on the shaft directly adjacent to the ends of the collar. The outer ends 40 of the rollers 30 have counterbores formed therein for respectively receiving nuts 42 which are threaded onto the outer end of the shaft 34 to thereby hold the rollers on the shaft.

The pair of chains 32 is entrained about a pair of drive sprockets (not shown) at the downstream end of the apparatus 10 which sprockets are mounted on a drive shaft 48 (FIG. 2), and a pair of idler sprockets 50 are mounted on a shaft 51 at the upstream end of the apparatus 10 to thereby form the horizontal runs, or upper reaches, of the roller conveyors. The chains 32 are further entrained about a pair of idler sprockets 54 mounted on a shaft 56 which is located directly below the shaft 51. As shown in FIGS. 1 and 2, a take-off conveyor 13 extends transversely between the upper and lower reaches of the conveyors 22 and 24 to receive potatoes forced over the outside edges of the conveyors, as will be hereinafter described in detail. Elongated inverted channels 62, each having a resilient strip of material 64 on the flat upper surface thereof (see FIG. 5), extend horizontally under the rollers 30 of the upper reaches of the conveyors 22 and 24 to support the rollers and to provide resilient high-friction surfaces to cause the rollers to continuously rotate as they are moved along.

Referring again to FIGS. 1 and 2, it will be seen that the supporting channels 62 are, in turn, supported by several transversely extending channels 66 mounted within a generally rectangular framework. The framework includes a pair of side panels 68 and is supported at a suitable elevation by vertically extending legs 70. The elevation of the apparatus 10 is such that at the downstream end of the horizontal runs, the conveyors 22, 24, 26 and 28 are at a height slightly above the cups 16 of the weight-sizing apparatus 14 into which the potatoes are to be discharged.

The power for driving the drive shaft 48 of the apparatus 10 is preferably supplied by a suitable drive chain connection (not illustrated) to the shaft 20 at the upstream end of the weight sizing apparatus 14. The cups 16 of the weight sizing apparatus and the roller conveyors 22-28 are driven in synchronization to cause the potatoes ejected from the valleys between the rollers of the roller conveyors to be properly discharged into the cups of the weight sizing apparatus. It should be noted that under optimal conditions each and every cup 16 of the apparatus 14 will be sequentially filled with a potato. This condition requires that one potato be discharged from each and every valley between the adjacent rollers at the downstream ends of the four roller conveyors. It should be recognized that such uniform spacing of the potatoes on the conveyor downstream ends is an optimal condition; quite often, due to the random distribution of potatoes to the singulating and aligning apparatus 10, the potatoes will not be distributed so as to uniformly fill the successive valleys of the four roller conveyors, and thus some of the valleys may be left vacant.

As shown in FIGS. 1 and 2, the delivery chute 12 includes four sloped bottom walls 71, vertical sidewalls 72 at the outer sides of the chute, and two vertical walls 74 which are longitudinally aligned with the respective drive chains 32 between the conveyors 22 and 24 and the conveyors 26 and 28 and which separate the outer pairs of walls 71. Inclined guide surfaces 76 are provided at the downstream ends of the inner pair of sloping walls 71, and slanted guide surfaces 77 are formed at the discharge ends of the outer pair of sloping walls 71 so that all the potatoes moving down the delivery chute will be directed onto the roller conveyors 22-28.

Potatoes are continuously fed at random orientations from the chute 12 to the upstream ends of the roller conveyors. Two parallel sets of flaps 80 and 81 are suspended above the roller conveyors for the purpose of turning and forcing the potatoes lengthwise into the valleys between the rollers 30, such that the potatoes end up being carried in the valleys with their long axes being parallel to the axes of the rollers and thus perpendicular to the path of travel of the conveyors. The flaps are oriented at shallow angles with the rollers as shown in FIG. 1. The flaps are formed by a flexible sheet of material 82, such as rubber belting, having a thin sheet 83 (FIG. 5) of a smooth, slippery material, such as a polytetrafluoroethylene polymer (for example, a Teflon polymer), applied to the upstream surfaces thereof. The upper ends of the flaps 80 and 81 are secured to rails 84 and 85, respectively, and the rails are, in turn, bolted to transverse channels 89 and 90, respectively, which are mounted between the side panels 68 of the apparatus 10 (FIG. 1).

The flaps 80, 81 are bolted to the transverse channels 89 and 90 so that they extend diagonally across the associated roller conveyors with the upstream end of each of the flaps being situated adjacent the sides of a vertical guide member 91 which extends between the associated pairs of roller conveyors 22 and 24 directly above the drive chains 32. Upwardly and outwardly sloped guide walls 92 and 93 extend longitudinally at the outer ends 40 of the rollers 30 of the respective roller conveyors in order to maintain the potatoes on the rollers of the conveyors. The sloped guide walls 93 are part of a fabricated central guide member 94 (FIG. 5) extending longitudinally between the widely spaced roller conveyors 24 and 26. The flaps 80 and 81 have straight lower edges which lie adjacent the uppermost surfaces of the rollers 30 (FIG. 5) and which are diagonally cut away at their outer, downstream edges to generally conform to the sloped contours of adjacent sloped guide walls 92 and 93.

Potatoes which are not initially oriented lengthwise in the valleys between the rollers will impinge against the slippery faced, lower ends of the flaps 80 and 81, and, under the pressure exerted by the flaps, the misoriented potatoes will turn and roll on the rollers and fall lengthwise into the valleys between the rollers. For example, as shown in FIG. 5, the misoriented potato P1 on conveyor 22 will be caught by the flap 80 and will be turned while riding the top of the rotating roller 30 into the valley between such roller and the adjacent upstream roller (not shown). Potato P2 on conveyor 24 in FIG. 5 will remain in the valley between the roller 30 and the adjacent downstream roller (obscured by the flap). Flaps 80 and 81 are mounted in spaced relationship above each of the roller conveyors to assure that any potatoes not properly aligned by the first flap 80 will be either realigned in the proper manner by the second flap 81 or forced outwardly against the associated sloped wall 92 or 93 to ride at the outside edge of the conveyor, as described hereinafter.

Due to the diagonal orientation of each flap, whereby the flap extends from an upstream position at the inner end 38 of the underlying roller to a downstream position at the outer end 40 of the roller, potatoes which are positioned closely adjacent to the outside edge of the conveyor and which are oriented such that their longitudinal axes are parallel to the path of travel of the roller conveyors, such as potato P3 in FIG. 5, will be directed by the diagonally extending flap toward the outside ends 40 of the supporting rollers and against the adjacent sloped guide wall 93. Such potatoes may pass by the flaps 80 and 81 adjacent the outer ends of the rollers without being realigned and thus may be carried at the side of the conveyor beyond the end of the guide walls 92 or 93 (FIG. 3). However, such potatoes, upon losing their lateral support by the adjacent guide wall, will fall over the open outer ends of the rollers 30 onto the take-off conveyor 13 therebelow; this is illustrated in FIG. 3 with respect to potato P4.

Those potatoes which have been forced lengthwise by the flap members into the valleys between the rollers 30 are next carried by the roller conveyors 22-28 into the singulating section of the apparatus 10. Generally, within the singulating section of the apparatus 10, the potatoes are laterally transferred in the valleys of the roller conveyors toward the outer ends 40 of the rollers to an extent that only one file of potatoes is left remaining on each of the respective roller conveyors near the outer ends 40 of the rollers, and any and all additional potatoes in the valleys are pushed over the outer ends of the rollers onto the underlying take-off conveyor 13.

The singulating section of the apparatus includes a plurality of lateral transfer assemblies 100 (FIGS. 3 and 4), one for each conveying lane, with each assembly including a series of free-rotating, sprocket-like discs 101-106 arranged in overlapping relationship in vertical planes and extending diagonally across the underlying roller conveyor from a position adjacent the downstream end of the vertical guide member 91 to a downstream position which is spaced by a selected distance x (FIG. 3) from the outer ends 40 of the rollers 30 of the conveyor. The discs are arranged such that the downstream disc of each pair of adjacent discs, such as disc 102 (FIG. 9), is recessed behind and is overlapped by the downstream end of the adjacent upstream disc, such as disc 101. Thus, the disc 102 is recessed behind the overlapping disc 101, disc 103 is recessed behind the overlapping disc 102, and so forth, with the final downstream disc 106 (hereinafter referred to as the downstream disc) being recessed behind the adjacent disc 105. All of the discs are of identical form and are vertically mounted with their axes of rotations lying in a common horizontal plane.

As best seen in FIG. 4, each disc has a plurality of uniformly spaced cogs 108 formed on its periphery, with arcuate recesses 110 formed therebetween. The arcuate recesses 110 are cut so that they will mate with the upper arcuate surfaces of the rollers 30. Each of the discs is configured and mounted relative to the rollers such that a cog 108 of the disc will substantially fill, in the diagonally extending plane of the disc, the valley between the rollers when such valley is directly below the axis of rotation of the disc. The axes of rotation of the respective discs 101-106 are offset from each other whereby a cog of each of the discs will sequentially fill a valley between two rollers as such valley moves downstream from the upstream disc 101 to the downstream disc 106. A valley between two rollers is sometimes partially filled by cogs of adjacent discs—such a condition being shown with respect to the cogs of discs 102 and 103 in FIG. 4.

Figure 6:
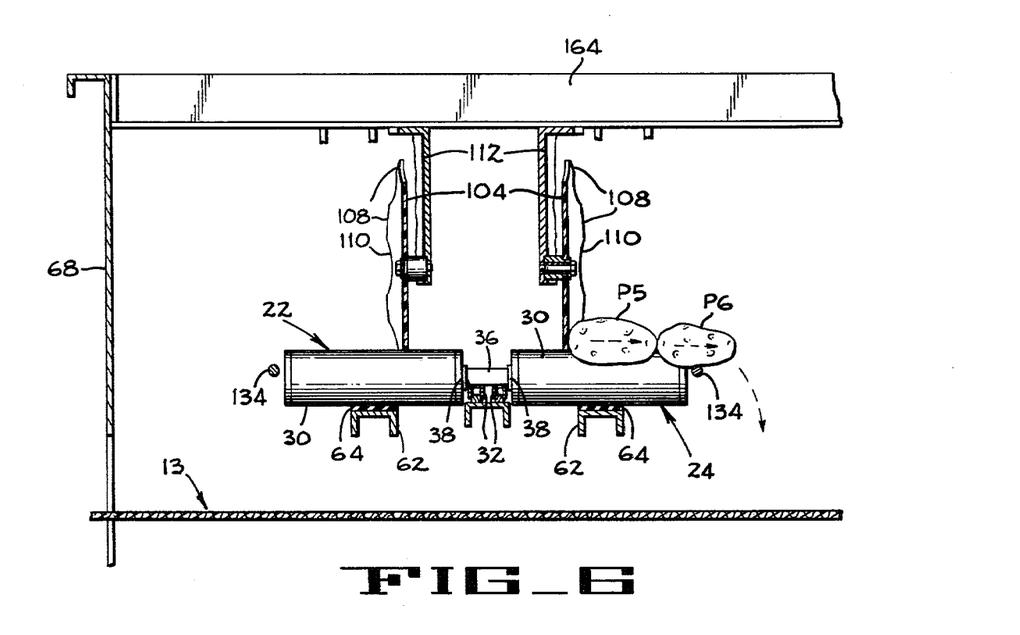
FIG. 6 is an enlarged sectional view taken on line 6—6 of FIG. 1.
Figure 9:
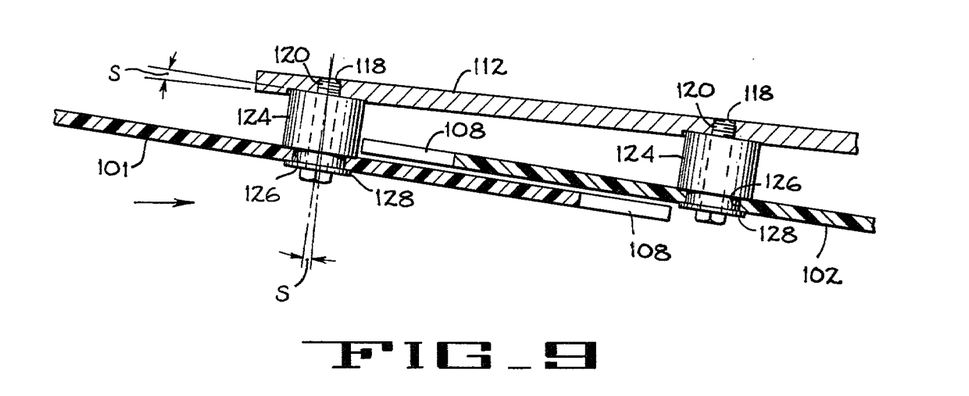
FIG. 9 is an enlarged sectional view taken on line 9—9 of FIG. 4.

As depicted in FIGS. 3 and 6 the series of discs 101-106 are rotatably mounted to an elongate support member 112 which extends diagonally from a position above one of the chains 32 at a position proximal the downstream end of the vertical guide member 91 to a downstream position which is spaced a selected distance from the outer ends 40 of the rollers. The flanged upper end of the support member 112 is bolted to a pair of transversely extending rails 114 and 116 which are mounted to the side panels 68 (FIG. 1). Six uniformly spaced parallel bores 118 (two of which are shown in FIG. 9) are formed at skewed angles, S, through the vertical portion of the support member 112 for receiving mounting bolts 120. Counterbores are provided at the outer ends of bores 118 to receive hubs 124 which are shouldered at their opposite, outer ends and tightly engaged within axial bores 126 in the respective discs, all as shown in FIG. 9. The hubs 124 are journaled on the bolts 120, with washers 128 being interposed between the outer ends of the hubs 124 and the head of the mounting bolts 120. Hence, the hubs rotate about the bolts 120 between the counterbored outer surface of the support member 112 and the washers 128. As clearly illustrated in FIG. 9, due to the skewing of each of the bores 118 with respect to the vertically extending face of the support member 112, the discs will rotate in closely spaced parallel planes, with the downstream disc of any pair of adjacent discs being recessed slightly behind the upstream disc.

It will be appreciated that the aforedescribed overlapping relationship of the discs prevents potatoes from being caught under the downwardly moving upstream halves of the discs. In other words, the possibility that potatoes will be caught by scissoring action between a disc and a roller is prevented by the overlapping relationships of the discs since the potatoes can only be received upon the upwardly moving downstream halves of the discs.

It should be noted in this regard that a potato is not only elongated but is also, typically, asymmetrically shaped about its long axis; that is to say, a potato may often have a small end and a large end. As the rollers 30 rotate in a direction counter to the direction of travel of the roller conveyor, the potatoes P spin in the opposite direction from that of the rollers. As a potato spins, it tends to screw itself along the valley between the rollers in the direction of its smaller end. If the smaller end of a potato is oriented toward the discs, it will tend to wander in the valley toward a disc. Moreover, when two potatoes are engaged end to end in the same valley, as often occurs, one potato may force the other into engagement with the discs. In the apparatus of the present invention, due to the extension of the disc cogs 108 into the valleys or spaces between the rollers, the potatoes P will not be permitted to become engaged under any portion of a diverting disc either under the force of an adjacent potato or because of the "screwing" action caused by the asymmetric shape of such disc. Thus, it is the projection of the cogs into the valleys which prevents the end of a potato from becoming forced under the edge of the diverting surface which can happen when a fixed blade type of diverting member is used.

The spacing of the downstream disc 106 from the outer ends 40 of the rollers is selected according to the dimensions of the articles in the valleys, which, in the case of potatoes, means that such distance is selected according to the lengths of the potatoes in any given batch of potatoes. As stated above, the purpose of the singulating section of the apparatus 10 is to eliminate all but one potato from each of the valleys between the rollers 30 and to force all other potatoes onto the underlying take-off conveyor 13 thereby feeding the remaining single file of potatoes along the outside margin of the roller conveyor to the aligned cups 16 of the weight-sizing apparatus 14. To accomplish this, the distance between the end of the downstream disc 106 and the outer end 40 of the rollers is approximately equal to one and one-half times the length of the smallest potato to be singulated in order to insure that if two very small potatoes are received in a single valley, the outermost potato will be rejected. As shown in FIGS. 3 and 6, as the two transversely aligned potatoes P5 and P6 are carried toward the narrow passageway adjacent the downstream disc 106 the outermost potato P6 will be pushed over the outside edge of the roller conveyor prior to reaching such narrowed passageway. The potato P6 will fall onto the take-off conveyor 13, and, by suitable transfer conveyor means (not shown), will be delivered again to the delivery chute 12 at the upstream end of the apparatus. The innermost potato P5 will remain on the roller conveyor and be carried through the passageway at the outside margin of the conveyor 24 to be delivered to a cup 16 of the weight-sizing apparatus 14.

It should be noted at this point that if the articles being singulated were of uniform size, the spacing of the downstream disc 106 from the outside of the roller conveyor would be approximately equal to the length of such uniformly sized articles.

As shown in FIGS. 3 and 4 a pair of angled diverting plates 132 are secured to the downstream end of the central guide member 91 and extend in a downstream direction from the opposed downstream ends of such guide member. Each plate 132 has a downstream edge 133 (FIG. 4) which extends outwardly and upwardly from within the space at the inner ends 38 of the rollers 30 to a position overlapping the end of the upstream disc 101. Each diverting plate 132 thus pushes the potatoes outwardly from the lateral transfer assemblies 100 and prevents the potatoes from being caught under the upstream end of the upstream discs 101.

In order to prevent potatoes from wandering over the outside edge 40 of the rollers 30, a rod 134 is longitudinally disposed closely adjacent to such outer edges of the rollers. As best shown in FIGS. 4 and 6, each rod 134 is horizontally disposed and lies at an elevation between the axes of rotation of the rollers and the tops of the rollers. The elevation of the rod 134 depends upon the spacing between the rollers and the diameters of the potatoes being handled. The upstream end 136 (FIG. 4) of each rod 134 is affixed to a plate 138 which is secured to the downstream end of the central guide member 91. The other end of the rod is provided with a short, downturned leg 140 which is bolted to a bracket 142 extending transversely across the apparatus at the downstream end of the lateral transfer assemblies 100. A short delivery board, or ramp, 144 is mounted upon the bracket 142, and the vertical leg 140 of the rod 134 extends through an opening in the ramp. Potatoes which are forced by the diverting discs 105 or 106 over the outer ends of the rollers will thereby fall onto the ramp 144 from which they will gravitate to the take-off conveyor 13. Each rod 134 is of a polished steel to provide a low friction surface over which the potatoes may be pushed by the associated lateral transfer assembly.

As previously noted, potatoes vary greatly in length in a typical field batch, and the longest potatoes in some groups may be more than twice as long as the shortest potatoes in the group. Accordingly, the apparatus 10 of the present invention includes a hold-down mechanism 148 for yieldably applying a downward force on the potatoes passing through the passageway adjacent the downstream disc 106 of each of the lateral transfer assemblies to thereby retain extra long potatoes on the conveyor despite the fact that the major portion of such potatoes may extend over the outside ends 40 of the rollers.

Figure 7:
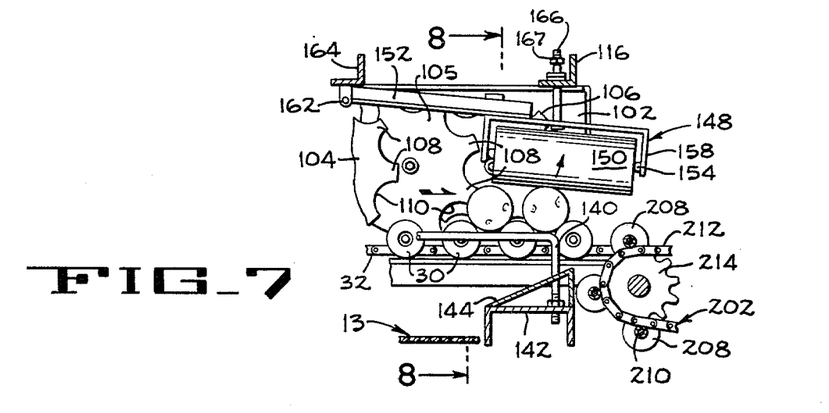
FIG. 7 is a fragmentary sectional view similar to a portion of FIG. 4 but showing the operation of the hold-down mechanism at the downstream end of the singulating section of the apparatus of the present invention when such mechanism is elevated by an article passing therebeneath.
Figure 8:
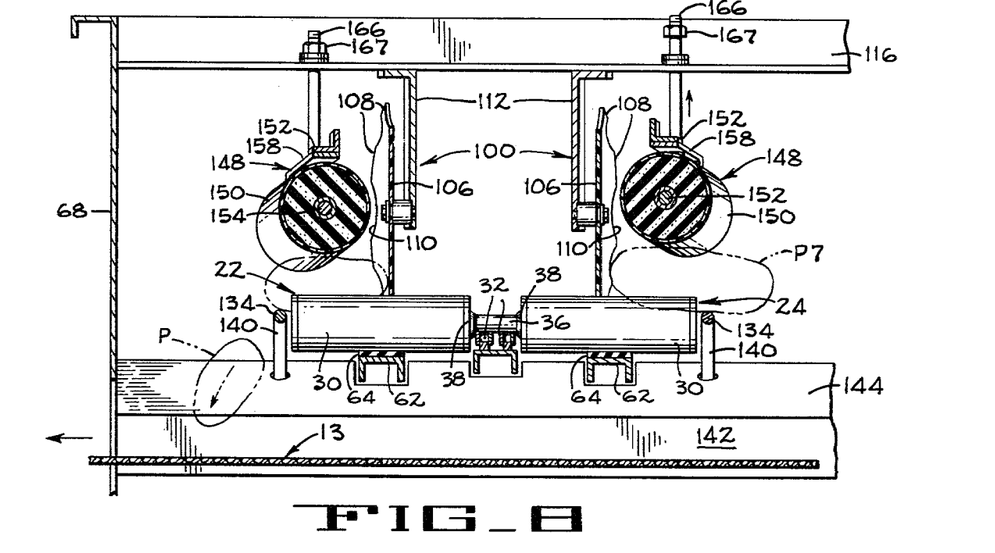
FIG. 8 is an enlarged sectional view taken on line 8—8 of FIG. 7.

As best seen in FIGS. 7 and 8, each hold-down mechanism 148 comprises a resilient, cylindrical member 150 which is mounted for rotation about an axis that is parallel to the planes of the discs 101–106. The resilient member is also mounted for articulation up and down over the narrow passageway adjacent the downstream disc 106. The resilient member comprises a cylinder of foam material warpped in a plastic sheet material, such as vinyl, and is rotatably mounted on a shaft 154. The shaft is supported at its ends by the downwardly extending legs of a U-shaped bracket 158 which is affixed to the downstream end of a pivot arm 152. The upstream end of the arm 152 is pivotally connected by a coupling 162 to a transverse rail 164 which is mounted to the side panels 68 of the apparatus 10 between the rails 114 and 116. The pivot arm 152 is mounted to pivot in a plane which is also parallel to those of the diverting discs 101–106. The bracket 158, which supports the resilient member 150, is suspended upon a bolt 166 which is loosely received in a bore formed in the overlying transverse rail 116 (FIG. 8) so that it can reciprocate up and down under the impetus of the passing potatoes. The lower end of the bolt is fastened to the bracket 158, and a nut 167 is adjustably mounted to the upper end of the bolt above the rail 116 to permit the resilient member 150 to hang at a selected height above the rollers 30. The selected spacing of the resilient member above the rollers is, of course, determined according to the dimensions of the potatoes being handled.

The potatoes carried on the roller conveyors 22–28 will, depending on their diameters, sequentially impinge against the bottom of the resilient member 150, thereby causing the member 150 to pivot the arm 152 upwardly to conform to the size of the potatoes. As the potatoes are simultaneously forced laterally by the diverting discs 105 and 106, the resilient member will be caused to rotate on the shaft 154. Due to the simultaneous rotation and upward pivoting movement of the resilient member, the member will act to hold down the potatoes on the rollers without scuffing or otherwise damaging such potatoes.

It will be appreciated that if the articles being singulated were of a relatively uniform size, it would not be necessary to employ the hold-down mechanism 148 since such mechanism is only useful when an article abutting the diverter is long enough so that the major portion thereof extends over the outer ends 40 of the rollers 30 thereby causing the article to fall off the rollers but for the bias applied by the hold-down mechanism.

The apparatus 10 of the present invention further includes four supplemental roller conveyors positioned at the downstream ends of the roller conveyors 22, 24, 26, and 28, with two of such supplemental roller conveyors 200 and 202 being shown in FIG. 1 at the downstream ends of conveyors 22 and 24, respectively. The supplemental conveyors are seen to lie adjacent the outer edges 40 of the rollers 30 of the respective roller conveyors 22 and 24 extending from the lateral transfer assemblies 100 to the weight sizing apparatus 14 to thus support fully the potatoes which extend over the outer edges of the rollers 30 after such potatoes pass under the hold-down mechanisms 148. As generally shown in FIGS. 1 and 2, the supplemental conveyors are each comprised of series of relatively short, outer rollers 208 mounted by stub shafts 210 to endless chains 212. The endless chains 212 are entrained about drive sprockets 213 (one only shown in FIG. 2) which are mounted to the drive shaft 48, about rear idler sprockets 214 which are entrained about a common idler shaft, and about lower tension sprockets 218 entrained about a common shaft 220. The rollers 208 are supported by longitudinally extending horizontal channels 222 which have a resilient sheet of material on the upper surface thereof. The channels 222 are, in turn, supported on transverse rails 224 (FIG. 2) extending between the side walls 68 of the apparatus. The rollers of the supplemental conveyors are transversely aligned and move synchronously with the rollers 30 of the associated main conveyors 22–28. In effect, the conveyors 200 and 202 simply constitute lateral extensions of the roller conveyors 22 and 24, respectively, at the downstream ends thereof.

It will be seen in FIG. 1 that the outside ends 40 of the rollers 30 of conveyor 24 are aligned with the center of the associated lane L2 of weight sizing cups 16 of the weight sizing apparatus. Accordingly, potatoes on the conveyor 24 which are aligned by the transfer assembly 100 will be carried along a straight path directly into such weight sizing cups. A vertically extending rigid guide plate 225 is secured adjacent the inner ends of the rollers 208 of the supplemental conveyor 202. This guide plate has a lower edge (FIG. 2) extending below the tops of the rollers of the adjacent conveyor 202 and has a top edge which is bolted to a pair of transverse rails 206 that are connected to the side panels 68 of the apparatus. A long resilient flap 226 made from a rubber-based belting material extends longitudinally above the middle of the rollers 30 of the adjacent, cooperating conveyor 24 in alignment with the inner edge of the cups 16 in lane L2. The lower edge of the flap 226 lies immediately above the upper surface of the rollers 30 (FIG. 4). A rail 227 is attached to the upper edge of the flap 226, and the rail is, in turn, bolted to the overhead rails 206. The flap 226 and the guide plate 225 thus serve as guide means to direct the potatoes carried on the adjacent conveyors 24 and 202 into the cups of the associated lane L2 of the weight-sizing apparatus.

It will also be seen from FIG. 1 that the outside ends 40 of the rollers 30 of the other roller conveyor 22 are displaced laterally outwardly from centers of cups 16 of the associated lane L1 of the weight-sizing apparatus whereby the aligned potatoes on conveyors 22 and 200 will not be aligned with the lane L1. Thus, it is necessary to redirect such potatoes inwardly toward the inside margin of conveyor 22 and thus toward the centerline of the associated lane L1. For this purpose another lateral transfer assembly 228 is provided, such assembly consisting of a series of four sprocket-like discs which are employed to laterally transfer potatoes received upon the conveyors 22 and 200 inwardly toward the inside margin of conveyors 22. The four discs of the assembly 228 are of a similar construction to the discs 101-106, with the only differences being brought about by the fact that the discs of assembly 228 extend diagonally across the supplemental conveyor at a steeper angle than that of the discs 101-106, and thus, the cogs formed on the periphery thereof must be narrower. The four discs of the assembly 228 are rotatably mounted in a similar fashion to discs 101-106 to a vertical support member 230, and the support member is bolted to the overhead rails 206. The assembly 228 will thus act, in the same manner as described hereinbefore in connection with the lateral transfer assembly 100, to laterally transfer potatoes inwardly toward the inside margin of conveyor 22 without cutting or otherwise damaging the potatoes in order to align such potatoes with lane L1 of the weight-sizing apparatus.

It will thus be seen that the aligning and singulating apparatus of the present invention is particularly well suited to operate upon produce such as potatoes which may tend to wander while being conveyed between the rollers of a roller conveyor. The diverting mechanisms comprise rotary members driven by the rollers of the roller conveyors with cog means being provided to extend down between such rollers and to move with the rollers to prevent pinching of the produce between the rollers and the diverting mechanism—a common problem with conventional diverters. A relatively simple gravity discharge arrangement provides both alignment and singulation in a single transfer movement of the produce, and a special hold-down device is provided to take care of any problems which may arise due to the variable sizes of the individual articles.

Although the best mode contemplated for carrying out the present invention has been herein shown and described, it will be apparent that modification and variation may be made without departing from what is regarded to be the subject matter of the invention.

What is claimed is:

1. An apparatus for receiving randomly oriented, elongate, ellipsoidal articles of varying lengths, such as potatoes, and discharging the articles in a single file in timed relationship, said apparatus comprising: a roller conveyor including an endless series of uniformly spaced parallel rollers having elongate spaces therebetween, means for supporting said rollers to form a horizontal upper reach, means for driving said series of rollers to move along a path of travel, means for causing said rollers to rotate as they are moved through a portion of said upper reach along said path of travel, said rollers having substantially unobstructed lateral edges along one side thereof through said upper reach portion, and means for laterally transferring articles carried upon said upper reach as they move through said upper reach portion including a frame, at least two discs rotatably mounted to said frame above said horizontal upper reach portion in closely spaced, generally vertical relationship, each of said discs having recesses formed in the periphery thereof for complemental engagement against said rollers in said upper reach and with projections formed between said recesses for extension into the spaces between said rollers, said discs being mounted to extend diagonally across said conveyor in overlapping relationship with the downstream end of the upstream one of said discs covering the upstream end of the downstream one of said discs in the path of travel of the articles, said discs being spaced in the direction of movement of the conveyor such that as a space between the rollers comes into registry under the axis of said upstream one of said discs, said space will be penetrated by a projection of said upstream disc, and as said space thereafter moves downstream, it will be penetrated concurrently by said projection of said upstream disc and by a projection of the adjacent downstream disc, and as said space moves further downstream, it will be penetrated only by said projection of said downstream disc, whereby said articles are pushed and transferred laterally in said elongate spaces by said discs without being caught between said discs and said rollers, said downstream disc being spaced a selected distance from said one side edge of said rollers such that only a single file of articles will be permitted to pass by said discs and remain on said conveyor, whereby said one open edge of the rollers permits excess articles to be pushed thereover to leave said single file thereof.

2. A conveyor apparatus for aligning and singulating elongate articles such as potatoes, said apparatus comprising: a endless roller conveyor having an upper reach with an inlet end for receiving said articles and an outlet end for discharging said articles; means for causing the rollers to continuously rotate; and means for arranging the articles in a single file adjacent one edge of the roller conveyor, said last-named means including a low barrier comprising a narrow smooth rod disposed slightly outwardly of said one edge of the roller conveyor at a level between the uppermost surfaces of the rollers and the axes of rotation on the rollers and said rod extending generally parallel to the conveyor whereby said rod prevents said articles from wandering over said one edge as they are rotated by said rollers but permits one article to be gently urged over the rod by another article occupying the same valley as said one article, and a diverter extending diagonally across said roller conveyor toward said one edge of the conveyor and terminating in a downstream position which is spaced from said one edge to form a passageway therebetween on the conveyor, such passageway having a dimension measured transversely to the direction of movement of the conveyor which is selected according to the lengths of said elongate articles, whereby said diverter serves to push all but one article within a respective valley over said one edge of the roller conveyor and said low barrier.

3. A conveyor apparatus according to claim 2 further including a flap overlying the conveyor and extending diagonally thereacross upstream of said diverter, said flap extending in a generally vertical plane.

4. In combination with a conveying apparatus including an endless series of parallel, uniformly spaced rollers for carrying elongate articles of varying lengths, such as potatoes, in the valleys between the rollers, means for driving the series of rollers along a path of travel, and support means for supporting said rollers in said path and for causing the rollers to rotate as they are moved in said path, an apparatus for arranging said elongate articles carried in the valleys into an aligned single file at a side edge of the series of rollers comprising: diverting means extending diagonally across the roller conveyor toward said side edge for urging the articles along said valleys outwardly toward said side edge, said diverting means terminating in a downstream edge which is spaced from said side edge of the roller conveyor by a distance measured parallel to the axes of said rollers which distance is predetermined according to the elongate dimensions of said articles, said diverting means thereby providing a narrow passageway on said conveyor opposite said downstream edge of the diverting means, and flexible means positioned above said passageway for yieldably biasing the articles within said passageway against the associated rollers to thereby prevent articles from falling over said side edge of the roller conveyor, said passageway being sized such that said diverting means will push all but one article within each respective valley over said side edge of the conveyor while said flexible means will retain all articles not pushed over said side edge in a single file on said roller conveyor, said means for yieldably biasing said articles within said passageway including a rotatable member of elastomeric material, and means for rotatably suspending said member above said roller conveyor so that said member is rotatable about an axis of rotation which is generally normal to the axes of rotation of the rollers to thereby permit said articles to move laterally within said valleys in the direction of said side edge of the conveyor while under the weight of said biasing member.

5. The combination according to claim 4 including means for mounting said biasing member for pivotal movement in the vertical plane.

6. In combination with a roller conveyor including an endless series of parallel uniformly spaced interconnected rollers, means for driving said rollers in a direction of travel, means for supporting said rollers to form an upper reach and for causing said rollers to continuously rotate while they move in said direction of travel, and means for feeding elongate articles of random orientations to an inut area of the upper reach, an apparatus for aligning the elongate articles, such as potatoes, fed to said input area within the valleys of the upper reach and for urging the articles not aligned within the valleys onto a side margin of the roller conveyor to thereby facilitate removal of such misaligned articles comprising: a frame mounted above said input area of the roller conveyor, at least one flap suspended from said frame at a position adjacent and downstream from said input area, said flap being made from a flexible sheet material, said flap having an upper edge which is attached to said frame, said flap having a lower edge positioned in close proximity to the rollers to thereby bear against articles conveyed on said rollers, said flap being mounted to said frame to extend diagonally with respect to said direction of travel, a first side wall extending longitudinally adjacent the upstream side edge of the flap from adjacent said input area to a location downstream from said flap, a second side wall adjacent the downstream side edge of the flap, said second side wall being sloped upwardly and outwardly from the side margin of the roller conveyor, said flap substantially filling the space between said roller conveyor, said frame, said first side wall and said second side wall, whereby said flap urges articles not positioned lengthwise within the valleys between said rollers to turn and fall lengthwise into the valleys as said articles are engaged by said flap, and whereby the diagonal orientation of the flap causes the articles which are not so turned into the valleys to be urged to positions on said side margin adjacent the sloping side wall, thereby facilitating their removal downstream from said wall.

* * * * *